United States Patent [19]

Ostrowski et al.

[11] 4,350,804

[45] Sep. 21, 1982

[54] CURABLE COMPOSITIONS COMPRISING AN AZOLE-FUNCTIONAL RESIN AND A METAL-LIGAND COMPLEX

[75] Inventors: John S. Ostrowski, Pittsburgh; John F. Grunewalder, Glenshaw; Nicholas T. Castellucci, Pittsburgh, all of Pa.

[73] Assignee: PPG Industries, Inc., Pittsburgh, Pa.

[21] Appl. No.: 208,971

[22] Filed: Nov. 21, 1980

[51] Int. Cl.$^3$ .................... C08G 59/14; C08G 73/06
[52] U.S. Cl. .................... 525/327.3; 523/400; 523/439; 525/348; 525/375; 525/420; 525/523; 525/326.7; 525/329.1; 528/92; 528/109; 528/117; 528/341; 528/361; 528/374; 528/377; 528/395; 528/407; 528/423
[58] Field of Search ............... 525/117, 107, 329, 336, 525/348, 375, 420, 523; 528/92, 109, 374, 377, 378, 407, 423, 341, 361, 395

[56] References Cited

U.S. PATENT DOCUMENTS

| | | | |
|---|---|---|---|
| 2,878,233 | 3/1959 | Harrison | 528/117 |
| 2,878,234 | 3/1959 | Peterson | 528/117 |
| 3,308,078 | 3/1967 | Rogers et al. | 260/27 |
| 3,324,050 | 6/1967 | Joo et al. | 528/117 |
| 3,677,978 | 7/1972 | Dowbenko et al. | 528/92 |
| 3,700,636 | 10/1972 | Maiss et al. | 525/117 X |
| 3,730,915 | 5/1973 | Tomalia et al. | 528/117 X |

FOREIGN PATENT DOCUMENTS 836695 6/1960 United Kingdom .

OTHER PUBLICATIONS

Handbook of Chemistry and Physics, 52nd Ed., (1971-1972), p. B-97.

*Primary Examiner*—Earl A. Nielsen
*Attorney, Agent, or Firm*—Thomas M. Breininger

[57] ABSTRACT

The invention is directed to curable compositions comprising an azole-functional resin and a labile metal-ligand complex. The azole-functional resin is the reaction product of a monomeric or polymeric resin and a reactive N-heterocyclic compound containing at least two nuclear nitrogen atoms in a 5-membered ring structure capable of forming stable metal-ligand complexes. Mixtures of azole-functional resins also may be used with the labile-metal ligand complexes in the compositions of the invention.

15 Claims, No Drawings

CURABLE COMPOSITIONS COMPRISING AN AZOLE-FUNCTIONAL RESIN AND A METAL-LIGAND COMPLEX

BACKGROUND OF THE INVENTION

Due to escalating energy costs and the recent emphasis on energy conservation, there has developed an increased need in the coatings and resins industry for compositions which can be cured at relatively low temperatures in short periods of time. Additionally, the reduction of processing times and handling problems involved in the use of multipackage compositions where curing agents are stored separately from the resins would be advantageous.

Accordingly, objects of the present invention are to provide compositions that are one package systems, are storage stable, cure at low temperatures, and cure in short time periods. Further objects of the invention will become apparent to the reader as the invention is described.

SUMMARY OF THE INVENTION

The present invention is directed to curable compositions comprising an azole-functional resin and a labile metal-ligand complex. The compositions of the invention in addition to having long pot lives at room temperature, have low curing temperatures and short curing times.

DETAILED DESCRIPTION OF THE INVENTION

The curable composition of the present invention comprises:
(A) an azole-functional resin; and
(B) a labile metal-ligand complex.

As used herein, the term "azole-functional resin" is understood to mean the reaction product of a monomeric or polymeric resin and a reactive N-heterocyclic compound containing at least two nuclear nitrogen atoms in a 5-membered ring structure, capable of forming stable metal-ligand complexes. In other words, the resins used in the compositions of the invention contain bound, 5-membered, N-heterocyclic rings having at least 2 nitrogen atoms within the ring. These bound N-heterocyclic rings are capable of forming stable complexes with various metal ions. Mixtures of azole-functional resins also may be used (as Component A) with the labile metal ligand complexes in the compositions of the invention.

Examples of N-heterocyclic compounds which may be used to form the azole-functional resins include imidazoles, triazoles, tetrazoles, thiadiazoles and mixtures thereof.

Examples of suitable imidazoles which may be reacted with a resin to form an azole-functional resin include: 2-mercapto-1,3-imidazole; 2-methyl-4-mercapto-1,3-imidazole; 5-mercapto-1,3-imidazole; 2-amino-1,3-imidazole; 5-amino-1,3-imidazole; 5-(N-methylamino)-1,3-imidazole; 4-(N-ethylamino)-1,3-imidazole; 4-amino-1,3-imidazole or mixtures thereof.

Examples of suitable tetrazoles which may be reacted with a resin to form an azole-functional resin include: 5-mercaptotetrazole; 5-aminotetrazole; 5-methylaminotetrazole; 5-ethylaminotetrazole or mixtures thereof.

Examples of suitable triazoles which may be reacted with a resin to form an azole-functional resin include: 3-amino-1,2,4-triazole; 5-amino-1,2,4-triazole; 4-amino-1,2,3-triazole; 5-amino-1,2,3-triazole or mixtures thereof. Additional examples of suitable triazoles include: 3-mercapto-1,2,4-triazole; 5-mercapto-1,2,4-triazole; 4-mercapto-1,2,3-triazole; 5-mercapto-1,2,3-triazole or mixtures thereof.

Examples of suitable thiadiazoles which may be reacted with a resin to form an azole-functional resin include: 2,5-dimercapto-1,3,4-thiadiazole; 2-mercapto-1,3,4-thiadiazole; 5-mercapto-1,3,4-thiadiazole; 2,5-diamino-1,3,4-thiadiazole; 2,5-diamino-1,3,4-thiadiazole; 2-amino-1,3,4-thiadiazole; 5-amino-1,3,4-thiadiazole; 2-mercapto-5-amino-1,3,4-thiadiazole; 5-mercapto-2-amino-1,3,4-thiadiazole; 2-ethylmercapto-1,3,4-thiadiazole; 5-ethylmercapto-1,3,4-thiadiazole; 2,5-bis (ethylmercapto)-1,3,4-thiadiazole; 2-ethylamino-1,3,4-thiadiazole; 5-ethylamino-1,3,4-thiadiazole; 2-propylamino-1,3,4-thiadiazole; 5-propylamino-1,3,4-thiadiazole; 2-mercapto-5-aminoethyl-1,3,4-thiadiazole; and 2-aminoethyl-5-mercapto-1,3,4-thiadiazole.

Of the above N-heterocyclic compounds, the triazoles and thiadiazoles are preferred. The above mercapto substituted triazoles are particularly preferred.

A wide variety of resins may be reacted with the N-heterocyclic compounds to form the azole-functional resins. The choice of resin is not critical provided it is capable of reacting with a suitable N-heterocyclic compound as described previously to form an azole-functional resin.

Generally, the N-heterocyclic compounds are reacted with polyepoxides to form the azole-functional resins. As used herein, the term polyepoxide refers to a compound or a mixture of compounds containing more than one 1,2-epoxy group of the formula

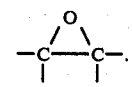

A number of polyepoxides are known many examples of which are described in the *Handbook of Epoxy Resins*, Henry Lee and Kris Neville, 1967, McGraw Hill Book Company. The polyepoxides may be saturated or unsaturated, aliphatic, cycloaliphatic, aromatic or heterocyclic and may be substituted with substituents such as chlorine, hydroxyl groups, ether-radicals and the like. The polyepoxides may be monomeric or polymeric.

Of the many resins which may be reacted with the N-heterocyclic compounds to form the azole-functional resins, it is preferred to use polyepoxides which are polyglycidyl ethers of polyphenols and/or polyepoxides which are acrylic resins containing pendant and/or terminal 1,2-epoxy groups.

Polyglycidyl ethers of polyphenols are generally known and may be prepared, for example, by etherification of a polyphenol with epichlorohydrin or dichlorohydrin in the presence of an alkali. Examples of suitable polyphenols include: 1,1-bis(4-hydroxyphenyl)ethane; 2,2-bis(4-hydroxyphenyl)propane; 1,1-bis(4-hydroxyphenyl)isobutane; 2,2-bis(4-hydroxytertiarybutylphenyl)propane; bis(2-hydroxynaphthyl)methane; 1,5-dihydroxynaphthalene; 1,1-bis(4-hydroxy-3-allylphenyl)ethane and the like. The polyglycidyl ethers of polyphenols also include the polymeric epoxy resins of various molecular weights which may be produced for example by varying the mole ratio of epichlorohydrin to polyphenol in known manner. Some examples of these polymeric polyepoxides include EPON 1001 (a polyglycidyl ether of bisphenol A having an average molecular weight of about 1000 and an epoxide equivalent weight of about 500), EPON 828 (a polyglycidyl ether of bisphenol A having an average molecular weight of about 377 and an epoxide equivalent weight of about 188), and EPON 812 (a polyglycidyl ether of bisphenol A having an average molecular weight of about 306 and an epoxide equivalent weight of about 150), all three polymeric resins available from the Shell Oil Company. As used above, an epoxide equivalent weight is the weight of polyepoxide in grams which contains one gram-equivalent of epoxy groups.

Suitable polyepoxides also include the polyglycidyl ethers of mononuclear polyhydric phenols such as the polyglycidyl ethers of resorcinol, pyrogallol, hydroquinone, and pyrocatechol.

Suitable polyepoxides also include the generally known polyglycidyl ethers of polyhydric alcohols such as the reaction products of epichlorohydrin or dichlorohydrin with aliphatic and cycloaliphatic compounds containing from two to four hydroxyl groups including, for example, ethylene glycol, diethylene glycol, triethylene glycol, dipropylene glycol, tripropylene glycol, propane diols, butane diols, pentane diols, glycerol, 1,2,6-hexanetriol, pentaerythritol and 2,2-bis(4-hydroxycyclohexyl)propane.

Also useful are the polyepoxides derived from the epoxidation of an olefinically unsaturated alicyclic compound. These polyepoxides are nonphenolic and may be obtained by epoxidation of alicyclic olefins, for example by oxygen and selected metal catalysts, by perbenzoic acid, by acetaldehyde monoperacetate or by peracetic acid. Among such polyepoxides are the epoxy alicyclic ethers and esters generally known in the art.

Polyepoxides which may be reacted with suitable N-heterocyclic compounds to form azole-functional resins also include those containing oxyalkylene groups. Oxyalkylene groups are typically groups of the formula:

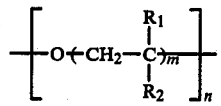

wherein $R_1$ and $R_2$ independently represent hydrogen or an alkyl group, preferably a lower alkyl group containing from 1 to 6 carbon atoms and wherein m is from 1 to 4 and n is from 2 to 50. The oxyalkylene groups may be part of the main polyepoxide chain itself or pendant to the main polyepoxide chain. Polyepoxides containing oxyalkylene groups are generally known and may be prepared, for example, by reacting some of the epoxy groups of a polyepoxide such as those mentioned above with an alcohol containing oxyalkylene groups. Suitable resins for the production of azole-functional resins also include polyglycidyl esters of polycarboxylic acids such as the generally known polyglycidyl esters of adipic acid, phthalic acid and the like.

Addition polymerized polymers containing epoxy groups may also be used to form the azole-functional resins of the invention. These polyepoxides may be produced by the copolymerization of a wide variety of generally known polymerizable vinyl monomers including for example, glycidyl acrylate, glycidyl methacrylate, and allyl glycidyl ether. These epoxy functional monomers may be copolymerized with any monomers containing at least one $CH_2=C<$ group such as styrene, alpha-methyl styrene, alpha-ethyl styrene, vinyl toluene, t-butyl styrene and allyl alcohol; halogenated monoolefinic hydrocarbons such as alphachlorostyrene, alpha-bromostyrene, ortho-, meta-, and parafluorostyrenes, 2,6-difluorostyrene, 3-fluoro-4-chlorostyrene, 2,4,6-trichlrrostyrene and dichloromonofluorostyrenes; unsaturated carboxylic acid amides such as acrylamide and methacrylamide; unsaturated nitriles such as acrylonitrile, methacrylonitrile, ethacrylonitrile, octenenitrile; and esters of methacrylic acids such as ethyl methacrylate, isopropyl methacrylate, isobutyl methacrylate and isobornyl methacrylate.

Acrylic resins containing pendant or terminal epoxy groups which may be reacted with suitable N-heterocyclic compounds to prepare the azole-functional resins may be prepared for example by the addition polymerization of compounds or mixtures of compounds such as glycidyl acrylate, glycidyl methacrylate and allyl glycidyl ether.

When a polyepoxide is used to prepare the azole-functional resin, the N-heterocyclic compound and polyepoxide are reacted generally in a ratio of equivalents of N-heterocyclic compound to equivalents of polyepoxide respectively of from about 0.5 to 1.0 to about 1.5 to 1.0, preferably from about 0.9:1.0 to about 1.1:1.0. In the present context, an equivalent of N-heterocyclic compound is the weight of compound in grams which contains 1 mole of N-heterocyclic moieties. The temperature of the reaction may vary widely but generally ranges from about 90° C. to about 140° C. An organic solvent generally is included in the reaction mixture to facilitate control of the reaction. Many suitable solvents or mixtures of solvents may be used such as the mono- and dialkyl ethers of ethylene and propylene glycol and the mono- and dialkyl ethers of diethylene glycol.

As indicated previously, although resins containing 1,2-epoxy groups generally have been reacted with the N-heterocyclic compounds to produce the azole-functional resins, any resins containing groups reactive with the N-heterocyclic compounds may be used to produce the azole-functional resins for the compositions of the present invention.

For example, the polymeric materials disclosed in U.S. Pat. No. 3,008,941 which are homopolymerization products of triazole compounds containing unsaturated amide groups or copolymerization products of these substituted triazoles with vinyl-containing organic compounds such as styrene, butadiene, vinyl acetate, methyl acrylate, vinyl chloride, vinylidene chloride, acrylonitrile, methacrylonitrile, vinylidene cyanide, acrylamide and the like may also be used as the azole-functional resins in the compositions of the present invention. So much of the disclosure of U.S. Pat. No. 3,008,941 as pertains to the description and preparation of these triazole-functional resins is herein incorporated by reference.

U.S. Pat. No. 3,753,956 discloses additional examples of azole-functional resins which may be used in the compositions of the present invention. The resins disclosed in U.S. Pat. No. 3,753,956 are polymeric materials containing repeating tetrazole units produced, for example, by (1) the reaction of 1-(4-aminophenyl)-5-(4-aminoanilino)tetrazole with a dicarboxylic dihalide in an inert solvent; (2) by the reaction of polyacrylonitrile or polymethacrylonitrile with an azide such as sodium azide in the presence of ammonium chloride or: (3) by the reaction of a tetrazole group such as a sodium salt of a sulfhydryl (e.g. 1-phenyl-5-mercapto-1H-tetrazole sodium salt) with a polymer containing reactive groups such as anhydride or ester groups. So much of the disclosure of U.S. Pat. No. 3,753,956 as pertains to the description and preparation of tetrazole-functional resins is hereby incorporated by reference.

As used herein, the term "labile metal-ligand complex" refers to a coordination complex of a metal ion with a monodentate or multidentate ligand capable of making the metal ion available for combination with N-heterocyclic groups in the azole-functional resin. The metal ion may be made available for combination with N-heterocyclic groups of the azole-functional resin by any suitable physical or chemical means. Examples of such means include but are not limited to: dissociation of the metal-ligand complex in the composition due to, for example, evaporation of the solvent, temperature changes, or chemical combination of the ligand common to the metal-ligand complex with a chemical agent; and decomposition of the metal-ligand complex, for example, by heating the composition or by reaction of the metal-ligand complex with a chemical agent. In the following examples, a labile metal-ligand complex is used which will make the metal ion available for combination with N-heterocyclic groups upon heating the composition to a temperature of about 82° C. or higher. However, practice of the invention in its broadest aspects should not be limited to metal-ligand complexes which make the metal ion available upon heating to within a given temperature range. Thus, once dissociation or decomposition of the labile metal-ligand complex occurs in a composition of the invention, the metal ion is available for crosslinking the azole-functional resin through N-heterocyclic groups in the resin.

Any labile metal-ligand complex containing a metal ion which is capable of complexing with any of the previously described N-heterocyclic groups in the azole-functional resins and which will make available the metal ion under any suitable conditions as discussed above may be used in the compositions of the invention. Examples of suitable labile metal-ligand complexes include the complexes of zinc, copper, cadmium, and zirconium with ethylenediamine, N-methylethylenediamine, 1,2-diaminopropane, 1,3-diaminopropane, N,N'-dimethylethylenediamine, diethylenetriamine and triethylenetetramine. As would be appreciated by one in the art, the positive charge due to the presence of the metal ion in the complex would be appropriately balanced by anions such as halide, phosphate, acetate, formate, carbonate, oxalate and the like. Of the above complexes, preferred are the complexes of zinc or copper with ethylenediamine or N-methylethylenediamine. For these preferred complexes, any suitable negative ion generally known in the art suitable for balancing the positive charge on the metal ion may be used.

A wide variety of solvents may be used in the compositions of the invention provided the metal complex is at least partially soluble in the solvent. Examples of suitable solvents include: the mono- and dialkyl ethers of ethylene and propylene glycol such as ethylene glycol monoethyl ether, ethylene glycol monobutyl ether, ethylene glycol diethyl ether, ethylene glycol dibutyl ether, ethylene glycol monoethyl ether acetate, ethylene glycol monohexyl ether acetate, propylene glycol monoethyl ether and propylene glycol dibutyl ether; the mono- and dialkyl ethers of diethylene glycol such as diethylene glycol monoethyl ether, diethylene glycol diethyl ether, diethylene glycol dibutyl ether and diethylene glycol monobutyl ether acetate; the lower alcohols such as methanol, ethanol, propanol, 1-butanol, 2-butanol, 2-chloro-1-propanol, 1-hexanol, 2-ethylhexanol and cyclohexanol; and the polar aprotic solvents such as acetone, acetonitrile, dimethylformamide, dimethyl sulfoxide and hexamethylphosphoric triamide. Generally in the following examples, ethyleneglycol monoethyl ether has been used as the solvent for the acetate and chloride salts of the zinc and copper complexes of ethylenediamine and N-methylethylenediamine. However as indicated previously the choice of metal-ligand complex and solvent will depend for example on the solubility of the complex in the solvent.

Generally the compositions of the invention contain amounts of labile metal-ligand complex and azole-functional resin to provide a ratio of equivalents of metal-ligand complex to equivalents of azole-functional resin respectively ranging from about 0.5:1.0 to about 2.0:1.0, preferably from about 0.8:1.0 to about 1.2:1.0. In the context of the present invention the term "equivalent of azole-functional resin" means the calculated amount of resin in grams that contains 1 mole of the N-heterocyclic groups available for reaction with the metal of the labile metal-ligand complex. For example, if 105 grams of an epoxide functional resin having an epoxide equivalent weight of 976 (therefore 0.108 equivalents) were reacted with 10 grams (0.108 equivalents) of 3-mercapto-1,2,4-triazole which has a molecular weight of 101 and may be represented by the formula,

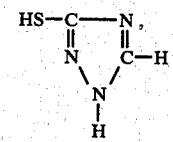

the calculated azole-equivalent weight of the product would be 1077 (i.e., 976+101). Thus as used herein, an equivalent of such an azole-functional resin would correspond to 1077 grams of the azole-functional resin.

The term "equivalent of labile metal-ligand complex" means that amount of metal-ligand complex in grams that can provide the amount of metal ion that can react with 1 equivalent of azole-functional resin. For example, 10 g of a triazole-functional resin having an equivalent weight of 1000 could be thought of as theoretically requiring 1.5 grams (i.e. 0.01 equivalents) of bis-ethylenediamine zinc (II) acetate (formula weight=303.6) for complete reaction during cross-linking of the triazole-functioning resin with the zinc since 1 mole of triazole groups can theoretically react with one half mole of zinc.

The compositions of the invention illustrated in the following working examples are substantially clear compositions. However, various generally known pigments and additives such as generally known pigment dispersing acids, flow control agents, flatting agents, surfactants, plasticizers, ultraviolet radiation absorbers and fungicides may be included in the compositions of the invention.

The compositions of the invention may be cured using any physical or chemical means suitable for making the metal ion of the labile metal-ligand complex available for combination with N-heterocyclic groups of the azole-functional resin as discussed previously in connection with the meaning of the term "labile metal-ligand complex." For example, the compositions of the invention may be cured upon evaporation of the solvent from the composition, upon heating of the composition, or upon the addition of a chemical agent to the composition so as to make the metal ion of the labile metal-ligand complex available for crosslinking via azole groups of the azole-functional resin. Of course, curing of the compositions of the invention by such means as heating the composition or evaporating the solvent will depend on such factors as the temperature at which the metal of the labile metal-ligand complex can be made available for crosslinking and the stability of the labile metal-ligand complex in the solvent with varying concentration. For example, a composition according to the invention comprising a complex of bis-ethylenediamine zinc (II) acetate, ethylene glycol monoethyl ether as solvent, and the reaction product of 3-mercapto-1,2,4-triazole with an acrylic resin prepared from 20% glycidyl methacrylate, 50% methyl methacrylate and 30% ethyl acrylate, could be cured in 10 minutes at 93° C. to an acetone resistant film having a 4H pencil hardness.

The compositions of the invention have the advantage of being room temperature storage stable for indefinite periods of time. Generally they remain fluid and suitable for use even after 4 weeks at room temperature. Of course these compositions may be storage stable for even longer periods of time.

The following examples illustrate the invention. All quantities and percentages are by weight unless specified otherwise.

EXAMPLE A

Preparation of a Complex of Zinc and Ethylenediamine

A complex of zinc and ethylenediamine was prepared according to the procedure described in British Pat. No. 836,695 as follows. An aqueous solution was prepared by dissolving 21.95 grams (0.10 mole) of zinc (II) acetate dihydrate in 25 ml of distilled water. This solution was heated to 90° C. An aqueous 50% solution of ethylenediamine containing 15.3 g ethylene diamine in 15.3 ml of distilled water was heated to 90° C. The aqueous solution of zinc (II) acetate then was slowly added to the ethylenediamine solution while stirring. The resulting mixture then was allowed to cool and the water evaporated off under vacuum to yield 33.4 g of a white, crystalline product having a melting point of 176°–183° C. The zinc content of the crystalline product was determined to be 18% by weight as compared to a theoretical yield of 19%.

EXAMPLE B

Preparation of a Complex of Copper and Ethylenediamine

A complex of copper and ethylenediamine was prepared as follows. An aqueous solution was prepared by dissolving 9.98 grams (0.050 mole) of copper (II) acetate monohydrate in 50 ml of distilled water. The solution was heated to 90° C. An aqueous solution of ethylenediamine was prepared by dissolving 9 grams of ethylenediamine in 10 ml of distilled water. The aqueous solution of copper (II) acetate then was slowly added to the ethylenediamine solution while stirring. The resulting mixture then was allowed to cool and the water evaporated off under vacuum to yield a dark, bluish-purple crystalline product.

EXAMPLE C

Preparation of a Triazole-Functional Acrylic Resin

A 1,2-epoxide-functional resin having an epoxide equivalent weight of 976 was prepared by reacting 20 percent glycidyl methacrylate, 50 percent methyl methacrylate, and 30 percent ethyl acrylate in ethylene glycol monoethyl ether. The resultant product containing epoxide-functional resin had a 47.8 percent by weight solids content. A 500 ml flask was equipped with a mechanical stirrer, dropping funnel, condenser, nitrogen inlet, and heating mantle. 220 g (0.108 equivalents) of the epoxide functional resin product was added dropwise over three to four hours to the 500 ml flask which had been preheated to 90° C. and contained 10 g (0.108 equivalents) of 3-mercapto-1,2,4-triazole dissolved in 85 ml of ethylene glycol monoethyl ether.

The resultant triazole-functional resin had a calculated azole-equivalent weight of 1077 (i.e. 1077 g of resin would contain 1 mole of triazole groups.)

EXAMPLE D

Preparation of a Triazole-Functional Resin from a Polyglycidyl Ether of Bisphenol-A A 500 ml reaction flask was charged with 25 grams (0.25 mole) of 3-mercapto-1,2,4-triazole and 75 ml of ethylene glycol monoethyl ether. The flask was equipped with an addition funnel, stirrer, condenser, thermometer and heating mantle. The mixture was heated to 100° C. and 240 grams (0.257 mole) of a 50% solids solution in ethylene glycol monoethyl ether of a polyphenol, available from Shell Chemical Co. as EPON 1001 (average Molecular Weight of about 1000, and epoxide equivalent weight of about 500) was added over a 1½ hour period. The temperature was maintained at 100° C. during the addition. The reaction mixture was stirred for an additional 3 hours until the reaction was complete. The resultant product was a clear, pale yellow, homogeneous liquid. The triazole-functional resin had a calculated azole-equivalent weight of about 606.

EXAMPLE E

Preparation of a Thiadiazole-Functional Resin from a Polyglycidyl Ether of Bisphenol A A 250 ml flask equipped with thermometer and stirrer was charged with 41 grams of 2,5-dimercapto-1,3,4-thiadiazole and 46.5 grams (50 ml) of ethylene glycol monoethyl ether. While the flask was maintained at room temperature, 126 grams (0.33 mole) of EPON 828 (average molecular weight of about 377 and epoxide equivalent weight of about 188) was slowly added over a period of about 1 to 2 hours. After addition of the EPON 828 was complete, the reaction mixture was stirred for ½ hour. The thiadiazole functional reaction product had a solids content of 78.2%, a calculated azole-equivalent weight at 100% solids content of 263.5, a number average molecular weight of 8215, a weight average molecular weight of 18,552, and a residual epoxide content of 0%. The above molecular weights were determined using gel permeation chromatography relative to sytrene.

EXAMPLE F

Preparation of a Triazole-Functional Acrylic Resin

A 1,2-epoxide-functional resin having an epoxide equivalent weight of 870 was prepared by reacting 20 percent glycidyl methacrylate, 40 percent methyl methacrylate and 40 percent 2-ethylhexylacrylate in ethylene glycol monoethyl ether. The resultant epoxide-functional resin containing product had a 67.3 percent by weight solids content.

A 500 ml flask was equipped with a mechanical stirrer, dropping funnel, condenser, nitrogen inlet and heating mantle. 250 g (0.193 equivalents) of the epoxide-functional resin product was added over three to four hours to the 500 ml flask which had been preheated to 90° C. and contained 15 g (0.162 equivalents) of 3-mercapto-1,2,4-triazole dissolved in 50 g xylene. The resultant triazole-functional acrylic resin containing product had a 58 percent by weight solids content.

EXAMPLE I 4 grams of the triazole-functional acrylic resin product of EXAMPLE C containing 1.28 grams solids was mixed with a solution of 0.20 grams of the complex of zinc and ethylene-diamine of EXAMPLE A in ethylene glycol monoethyl ether. The resultant mixture was a clear, pale yellow solution.

The resultant mixture, still fluid after several days, was then drawn down on a metal panel and cured for 10 minutes at 93° C. to produce a film. The cured film had a 4H pencil hardness and withstood over 100 acetone double rubs. Acetone double rubs wherever used herein are generally understood to mean back and forth, finger rubs with a cheesecloth dipped in acetone. The number of acetone double rubs wherever given herein is the number of acetone double rubs the cured film could withstand without any visible evidence of deterioration.

Comparison: 4 grams (containing 1.91 g solids) of the 1,2-epoxide-functional resin product of Example C (i.e. containing no azole groups) was added to 0.33 grams of the complex of zinc and ethylenediamine of EXAMPLE A in ethylene glycol monoethyl ether. The components did not mix well. Particles remained floating in the mixture even after addition of more ethylene glycol monoethyl ether. The composition was drawn down on a metal panel and cured for 10 minutes at 93° C. in the same manner as above. The cured film withstood only 4 acetone double rubs before failure.

Comparison: 4 grams of the triazole-functional acrylic resin product of EXAMPLE C was mixed with 0.04 grams of ethylenediamine. The mixture was drawn down on a metal panel and cured for 10 minutes at 121° C. The cured film withstood only 6 acetone double rubs before failure.

EXAMPLE II

Example I was repeated except that no ethylene glycol monoethyl ether was added to the complex of zinc and ethylenediamine of EXAMPLE A before addition of the complex of EXAMPLE A to the triazole-functional acrylic resin product of EXAMPLE C. The mixture was cured for 15 minutes at 93° C. to produce a film. The film withstood over 100 acetone double rubs.

EXAMPLE III 4 grams of the triazole-functional acrylic resin product of EXAMPLE C containing 1.28 grams solids was mixed with 0.19 grams of the complex of copper and ethylenediamine of EXAMPLE B and 10 to 15 drops of methanol.

The resultant mixture was then drawn down on a metal panel and cured for 30 minutes at 93° C. to produce a film. The film withstood over 100 acetone double rubs.

EXAMPLE IV

Example III was repeated except that the resultant mixture was cured for 15 minutes at 121° C. The film withstood over 100 acetone double rubs.

EXAMPLE V 2.57 grams of the triazole-functional resin product of EXAMPLE D was mixed with 0.72 grams of the complex of zinc and ethylenediamine of EXAMPLE A. The mixture was drawn down on a metal panel and cured for 20 minutes at 93° C. to produce a film which withstood over 100 acetone double rubs.

EXAMPLE VI 6 compositions were prepared, each containing 10 grams of the thiadiazole-functional resin product of EXAMPLE E which had been diluted to 63% solids with ethylene glycol monoethyl ether, 4.3 grams of zinc bis-ethylenediamine acetate, and 15 grams of ethylene glycol monoethyl ether. The compositions were drawn down on metal panels and cured at various temperatures to produce films with properties as summarized in the following table. The films withstood the number of acetone double rubs indicated before any evidence of deterioration was visibly evident.

TABLE 1

| Curing Time | Oven Temperature | Film Thickness | Pencil Hardness | Acetone Double Rubs |
|---|---|---|---|---|
| 20 mins. | 79.4° C. | 0.3–0.5 mm | B | 36 |
| 20 mins. | 93.3° C. | 0.3–0.5 mm | H | 30 |
| 20 mins. | 107° C. | 0.3–0.5 mm | 4H | 60 |
| 20 mins. | 121° C. | 0.3–0.4 mm | 4H | 80 |
| 20 mins. | 135° C. | 0.3–0.5 mm | 4H | >100 |
| 20 mins. | 149° C. | 0.2–0.5 mm | 5H | >100 |

As would be appreciated by those in the art, the resistance of these films to about 30 or more acetone double rubs is evidence for a substantial degree of cross-linking in the film.

EXAMPLE VII 5 grams of the product of EXAMPLE F (i.e., containing 58% solids) was mixed with 5 grams of the product of EXAMPLE D. To this mixture was added 1.9 grams of the complex of zinc and ethylenediamine of EXAMPLE A, 9 grams of ethylene glycol monoethyl ether, 10.4 grams of a white titanium dioxide pigment paste, 0.8 grams of butyl benzyl phthalate and 0.4 grams of BYK-301 (a silicone based mar additive available from BYK-Mallinckrodt Chemische Produkte, GmbH Ltd.) The composition was still fluid and useable after 4 weeks storage in a hot room at 48.9° C.

The mixture was drawn down on a metal panel and cured for 10 minutes at 135° C. to produce a film which withstood over 100 acetone double rubs and had a 3H pencil hardness.

What is claimed is:

1. A curable composition comprising:
(A) an azole-functional resin; and (B) a labile metal-ligand complex;
wherein said labile metal-ligand complex is capable of reacting with said azole-functional resin.

2. The composition of claim 1 wherein the azole of said azole-functional resin is selected from the group consisting of an imidazole, a triazole, a tetrazole, a thiadiazole and a mixture thereof.

3. The composition of claim 1 wherein the ratio of equivalents of said labile metal-ligand complex to said azole-functional resin is from about 0.5:1.0 to about 2.0:1.0.

4. The composition of claim 1 wherein said azole-functional resin comprises the reaction product of
(i) a compound selected from the group consisting of a triazole, a thiadiazole, a tetrazole, an imidazole, and a mixture thereof; and
(ii) a resin capable of reacting with said compound.

5. The composition of claim 4 wherein said compound is a triazole substituted by a primary amino, secondary amino or mercapto group on at least one nuclear carbon atom.

6. The composition of claim 4 wherein said compound is a thiadiazole substituted by a primary amino, secondary amino or mercapto group on at least one nuclear carbon atom.

7. The composition of claim 4 wherein said compound is a tetrazole substituted by a primary amino, secondary amino or mercapto group on the nuclear carbon atom.

8. The composition of claim 4 wherein said compound is an imidazole substituted by a primary amino, secondary amino or mercapto group on at least one nuclear carbon atom.

9. The composition of claims 4, 5, 6, 7, or 8 wherein said resin of component (ii) comprises a polyepoxide.

10. The composition of claim 9 wherein said polyepoxide is a polyglycidyl ether of a polyphenol.

11. The composition of claim 10 wherein said polyglycidyl ether is a polyglycidyl ether of bis(4-hydroxyphenol)dimethylmethane.

12. The composition of claim 9 wherein said polyepoxide is an acrylic resin containing epoxy groups.

13. The composition of claim 9 wherein the ratio of equivalents of said metal-ligand complex to said azole-functional resin is from about 0.5:1.0 to about 2.0:1.0.

14. The composition of claim 1 further comprising a pigment, an additive or a mixture thereof.

15. The composition of claim 4 further comprising a pigment, an additive or a mixture thereof.

* * * * *